United States Patent
Yoshioka et al.

(10) Patent No.: US 7,718,905 B2
(45) Date of Patent: May 18, 2010

(54) ELECTRONIC DEVICE AND METHOD OF REDUCING MULTI-PATH FADING

(75) Inventors: Masahiro Yoshioka, Tokyo (JP); Takashi Nakanishi, Tokyo (JP); Seiji Wada, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/582,993

(22) Filed: Oct. 19, 2006

(65) Prior Publication Data

US 2007/0099473 A1 May 3, 2007

(30) Foreign Application Priority Data

Nov. 2, 2005 (JP) ............................. 2005-319559
Sep. 7, 2006 (JP) ............................. 2006-243134

(51) Int. Cl.
*H05K 9/00* (2006.01)
(52) U.S. Cl. ..................... 174/384; 174/377; 455/300
(58) Field of Classification Search .............. 174/350, 174/377, 384; 361/816, 818; 455/300; 343/841
See application file for complete search history.

(56) References Cited

U.S. PATENT DOCUMENTS

| 4,941,207 A | * | 7/1990 | Maeda et al. | ............... 398/119 |
| 6,613,980 B1 | * | 9/2003 | McGhee et al. | .............. 174/521 |
| 2004/0001299 A1 | * | 1/2004 | van Haaster et al. | ........ 361/118 |

FOREIGN PATENT DOCUMENTS

| JP | 2004-220264 | 8/2004 |
| JP | 2005-86685 | 3/2005 |

* cited by examiner

*Primary Examiner*—Hung V Ngo
(74) *Attorney, Agent, or Firm*—Oblon, Spivak, McClelland, Maier & Neustadt, L.L.P.

(57) ABSTRACT

An electronic device has housing having plural inner surfaces, plural modules in the housing, and a communication section provided on each of the plural modules. The communication sections perform wireless communication to each other. One inner surface having the largest area among the plural inner surfaces of the housing has an electric wave absorber that absorbs an electric wave for use of the wireless communication.

4 Claims, 6 Drawing Sheets

FIG. 3A
(SAra)

FIG. 3B
(SArb)

FIG. 3C
(SAr)

FIG. 5A
(SBt)

FIG. 5B
(SBr)

FIG. 5C
(SBr)

ELECTRONIC DEVICE AND METHOD OF REDUCING MULTI-PATH FADING

CROSS REFERENCE TO RELATED APPLICATION

The present invention contains subject matters related to Japanese Patent Applications JP 2005-319559 and JP2006-243134 filed in the Japanese Patent Office on Nov. 2, 2005 and Sep. 7, 2006, respectively, the entire contents of which being incorporated herein by reference.

BACKGROUND OF THE INVENTION

1. Field of the Invention

The present invention relates to an electronic device containing plural modules in a housing which has plural inner surfaces. The present invention also relates to a method of reducing multi-path fading in a housing that has plural inner surfaces.

2. Description of Related Art

In an electronic device, boards contained in housing have been generally connected to each other with wiring. Alternatively, the boards and/or circuit elements provided on the board have been connected to each other with wiring pattern.

In a case of using the wiring and/or the wiring pattern, it has been difficult to improve a transmission speed based on any interference between the items of wiring by spurious radiation, electromagnetic induction and the like as well as any variations in an amount of delay at respective items of wiring. If a space occupied with the wiring or wiring pattern is made small when downsizing the electronic device, large interference between the items of wiring may arise. According to an inner structure of the electronic device, a position where wiring is to be located may be set. This deteriorates flexibility in a design of the electronic device, so that it may be difficult to design the electronic device.

Japanese Patent Application Publication No. 2004-220264 has disclosed an electronic device in which wireless communication can be performed without any wiring or the like to enable data transmission to be performed with a high speed.

SUMMARY OF THE INVENTION

When, however, performing wireless communication inside the electronic device, multi-path fading may occur by means of reflection of electric wave by any various kinds of parts or the like provided in an inner surface of the housing and inside the housing. This multi-path fading relates to a phenomenon where in a period of cycle of an original signal, a signal of another period of cycle, which is almost identical to the original signal, is supprerposed with the original signal, thereby distorting a waveform of the original signal. Thus, if wireless communication is performed inside the electronic device, the received signal is distorted by reflection, diffraction, dissipation, and the like, thereby decreasing a throughput thereof.

If, as described in Japanese Patent Application Publication No. 2004-220264, the whole of inside of the housing is provided with an electric wave absorber to prevent reflection of electric wave from occurring in the housing, it is difficult to provide an electronic device at low price. Further, if an electric wave absorber is provided at an effective portion to absorb electric wave, it is difficult to detect the effective portion when a position to set up the electric wave absorber is not changed to measure its transmission characteristics whenever the position is changed. This restricts efficient setting of the electronic device during a brief period of time.

It is desirable to provide an electronic device and a method of reducing the multi-path fading that are capable of reducing multi-path fading efficiently with ease.

According to an embodiment of the present invention, there is provided an electronic device having housing having plural inner surfaces, plural modules in the housing, and a communication section provided on each of the plural modules. The communication sections perform wireless communication to each other. One inner surface having the largest area among the plural inner surfaces of the housing has an electric wave absorber that absorbs an electric wave for use of the wireless communication.

As one inner surface having the largest area among the plural inner surfaces of the housing, one inner surface having the largest area in a part of the inner surface, which is exposed to an inner space of the housing, or one inner surface that is perpendicular to any shortest one of a width, a height, and a depth of the housing may be used.

According to another embodiment of the present invention, there is provided a method of reducing multi-path fading in housing that has plural inner surfaces. The method has the steps of providing one inner surface having the largest area among the plural inner surfaces of the housing with an electric wave absorber, and performing wireless communication in the housing.

In these embodiments, since one inner surface having the largest area among the plural inner surfaces of the housing has an electric wave absorber, it is possible to reduce the multi-path fading by decreasing reflected waves when wireless communication is performed in the housing. Since only one inner surface of the housing has an electric wave absorber, it is possible to provide an electronic device containing an electric wave absorber easily at a low price, as compared with a case where the whole of inside of the housing is provided with an electric wave absorber.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe embodiments of the present invention with reference to the accompanied drawings.

Figure 1:
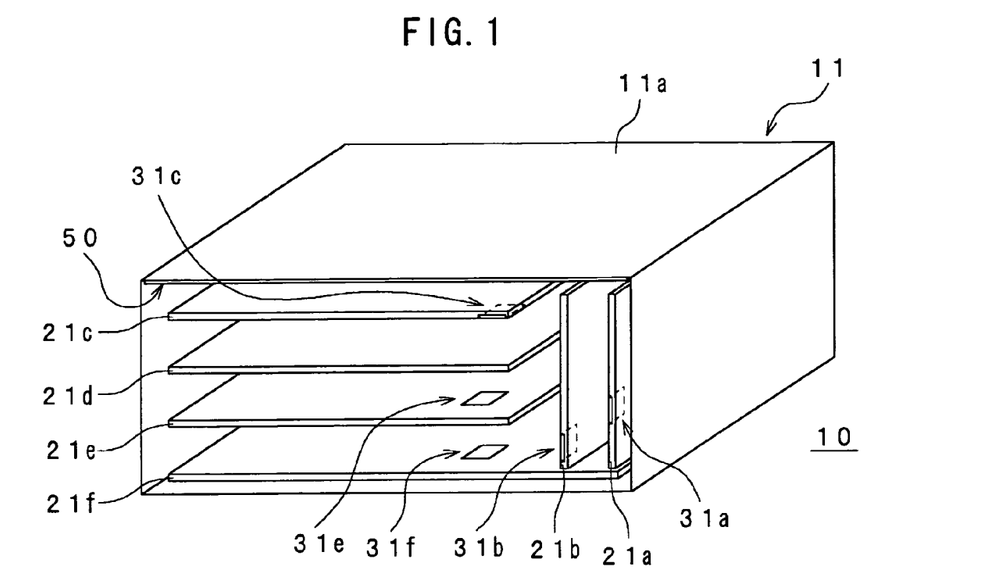
FIG. 1 is an illustration for illustrating an inner configuration of an embodiment of electronic device according to the invention.

FIG. 1 illustrates an outline configuration of an embodiment of electronic device according to the invention. This electronic device 10 has a housing 11. The housing 11 contains plural modules, for example, boards mounting active elements, passive element and the like, a recording/reproducing device for recording or reproducing signals by using recording medium, an input/output device of signals, a tuner and the like. It is to be noted that in FIG. 1, boards 21a through 21f are illustrated as modules.

Each of the modules contained in the housing has an antenna for enabling a signal to be transmitted to other module(s) with wireless communication without using any wiring and wiring pattern. For example, the board 21a has an antenna 31a. Similarly, the boards 21be through 21f have antennas 31be through 31f, respectively. Such the antenna may be separated from the module or be integrated with it. The antenna may be made as parts to be used in the module. For example, the antenna 31a is made as parts and attached to the board 21a. Antenna pattern as the antenna 31a is integrated with the board 21a. The antenna 31a is provided inside a package of a semiconductor element mounted on the board 21a.

Figure 2:
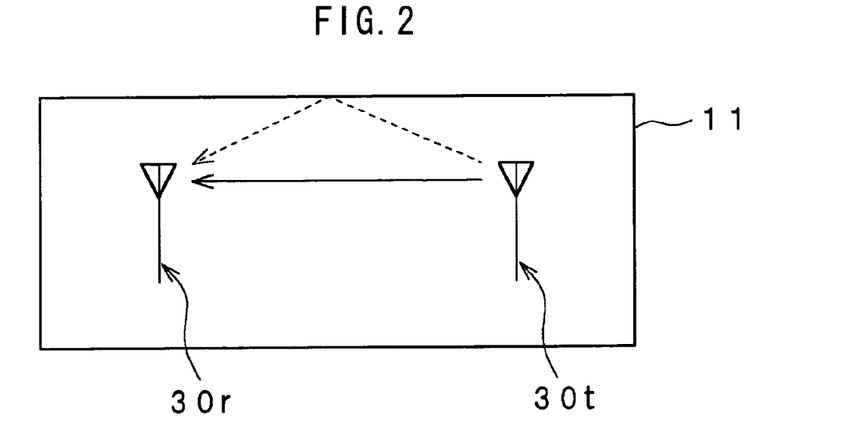
FIG. 2 is a drawing for illustrating multi-path fading.

If wireless communication is performed between the modules contained in the housing, multi-path fading may occur based on reflection of electric waves by the inner surfaces of the housing. FIG. 2 illustrates the multi-path fading.

In FIG. 2, if wireless communication is performed between the antennas 30t and 30r, the antenna 30r not only receives electric wave irradiated from the antenna 30t directly, but also receives electric wave reflected by an inner surface of the housing. The received signal obtained by receiving the electric wave with the antenna 30r is influenced by the reflected electric wave.

Figure 3A:
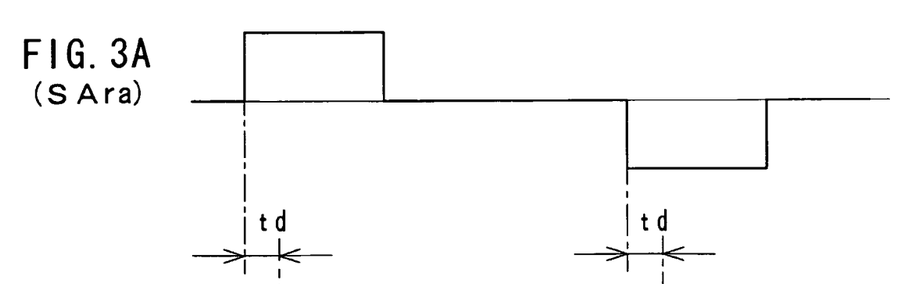
FIGS. 3A through 3C are graphs each for showing an influence of the multi-path fading.
Figure 3B:
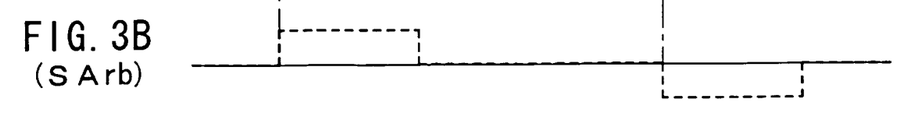
Figure 3C:
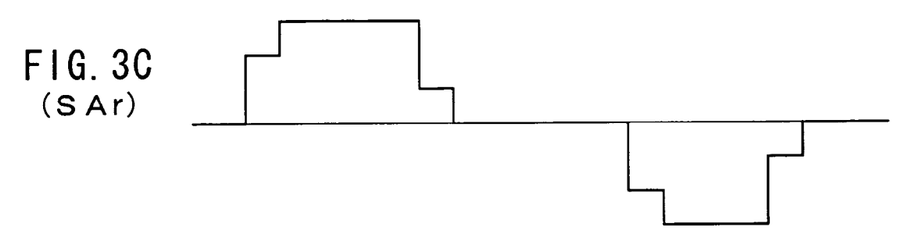

FIGS. 3A through 3C schematically show an influence of the multi-path fading. FIG. 3A shows a signal SAra based on an electric wave that the antenna 30r directly receives and FIG. 3B shows a signal SArb based on a reflected electric wave that the antenna 30r receives. Since a reflected electric wave has a longer transmission path than that of an antenna-direct-receiving electric wave, the signal SArb based on the reflected electric wave is delayed by only a period of time td as compared with the signal SAra. Further, since reflection damps a level of the electric wave stronger than damping in the antenna-direct-receiving electric wave, the signal SArb based on the reflected electric wave has a lower level thereof than that of the signal Sara. If multi-path fading occurs, the antenna 30r receives electric waves to obtain a signal SAr in which the signal SAra based on an electric wave that the antenna 30r directly receives is superposed by the signal SArb based on the reflected electric wave, so that the signal SAr has a distorted wave form as shown in FIG. 3C, thereby causing any deterioration in quality of received signal.

In the electronic device 10, one inner surface of the housing 11 having the largest area among the plural inner surfaces of the housing 11 is provided with an electric wave absorber that absorbs an electric wave for use of a wireless communication, if the wireless communication is performed between or among the modules contained in the housing 11, in order to reduce the multi-path fading easily and efficiently at a low price.

Such the area may be an area of a part of an inner surface, which is exposed to an inner space of the housing 11. Even if the one inner surface of the housing 11 has the largest area when an area of the part of this inner surface, which is exposed to the inner space of the housing 11, is smaller than that of other inner surface because the modules are closely set, any other inner surface having the largest area of an exposed part thereof is provided with an electric wave absorber. In other words, one inner surface of the housing 11 having the largest area of a part thereof by which electric wave is reflected is provided with an electric wave absorber, thereby enabling the reflected electric wave to be reduced.

One inner surface that is perpendicular to any shortest one of a width, a height, and a depth of the housing 11 may be provided with an electric wave absorber. For example, in the electronic device 10 as shown in FIG. 1, a height of the rectangular housing 11 is smallest, so that an inner surface of a top plate 11a that is perpendicular to the height thereof is provided with the electric wave absorber 50.

Thus, when one inner surface of the housing 11 having the largest area is provided with an electric wave absorber, it is possible to absorb any reflected electric waves efficiently in spite of a set position or a set direction of antenna. This allows any spuriously reflected electric waves and multi-path fading based thereon to be reduced, thereby enabling good wireless communication to be performed.

As the electric wave absorber, an electric wave absorber that absorbs electric waves by countervailing an incident electric wave and a reflected electric wave against each other, an electric wave absorber that converts an electric wave to thermal energy by using dielectric loss, magnetic loss, etc., and the like are used. For example, a sheet-type electric wave absorber obtained by mixing magnetic materials into any resin, a sheet-type electric wave absorber obtained by mixing iron powder into synthetic rubber, an application-type liquid electric wave absorber obtained by mixing magnetic materials and/or metallic powder into any resin, a pyramidal electric wave absorber obtained by impregnating carbon into resin such as polyurethane form and forming polystyrol, and the like are used. It is to be noted that if such the sheet and application-type electric wave absorbers are used, it is possible to provide with electric wave absorber one inner surface of the housing, which has the largest area of a part by which an electric wave is reflected. Further, if so, it is also possible to provide even place having a less area with electric wave absorber.

Figure 4A:
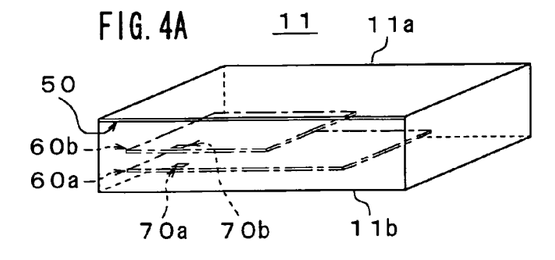
FIGS. 4A through 4F are drawings each for illustrating configurations of other embodiments of the electronic devices according to the invention.

A configuration of the housing 11 of the electronic device is not limited to the configuration shown in FIG. 1. For example, configurations shown in FIGS. 4A through 4F are conceivable. FIG. 4A shows a configuration of the housing 11 in which a first board 60a is provided over a large bottom plate 11be that has the largest area and a second board 60be is also provided over the first board 60a as well as wireless communication is performed between an antenna 70a on the first board 60a and an antenna 70be on the second board 60b. On such a configuration, one inner surface having the 30 largest area among the plural inner surfaces of the housing 11, for example, an inner surface of a top plate 11a that is opposite to the bottom plate 11be and has the largest area is provided with an electric wave absorber 50.

Figure 4B:
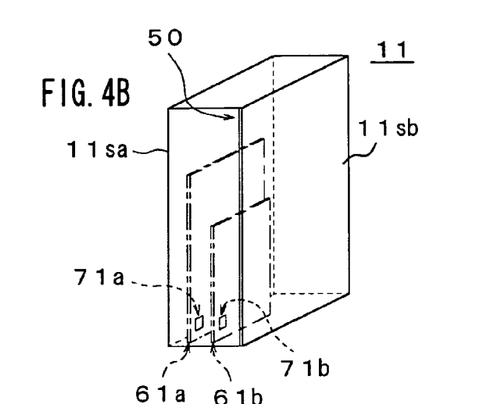

FIG. 4B shows a configuration of the housing 11 of tower type in which side plates 11sa, 11sb each has the largest area. In this housing 11, a first board 61a is set along the side panel 11sa in parallel and a second board 61be is also set so as to be opposed to the first board 61a as well as wireless communication is performed between an antenna 71a on the first board 61a and an antenna 71be on the second board 61b. On such a configuration, one inner surface having the largest area among the plural inner surfaces of the housing 11, for example, an inner surface of the side plate 11sb that is opposite to the side plate 11sa and has the largest area is provided with an electric wave absorber 50.

Figure 4C:
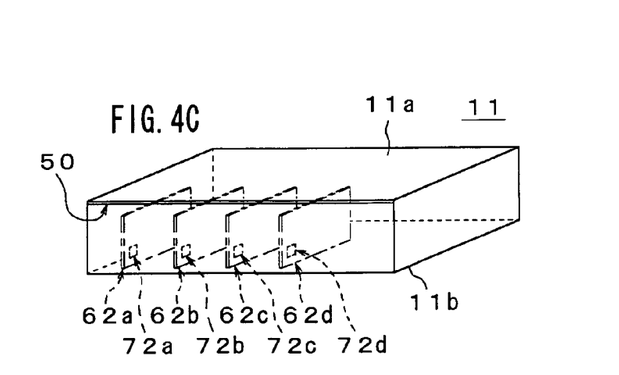

FIG. 4C shows a configuration of the housing 11 in which a bottom plate 11be has the largest area. In this housing 11, plural boards, for example, boards 62a through 62d, are vertically mounted on the bottom plate 11be as well as wireless communication is performed among antennas 72a through 72d on the boards 62a through 62d. On such a configuration, one inner surface having the largest area among the plural inner surfaces of the housing 11, for example, an inner surface of the top plate 11a that is opposite to the bottom plate 11be and has the largest area is provided with an electric wave absorber 50.

Figure 4D:
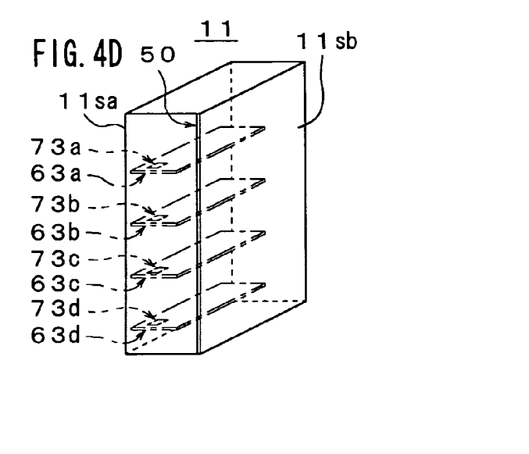

FIG. 4D shows a configuration of the housing 11 of tower type in which side plates 11sa, 11sb each has the largest area. In this housing 11, plural boards, for example, boards 63a through 63d, are vertically mounted on the side plate 11sa so as to be set in the housing 11 to its horizontal direction as well as wireless communication is performed among antennas 73a through 73d on the boards 63a through 63d. On such a configuration, one inner surface having the largest area among the plural inner surfaces of the housing 11, for example, an inner surface of the side plate 11sb that is opposite to the side plate 11sa and has the largest area is provided with an electric wave absorber 50.

Figure 4E:
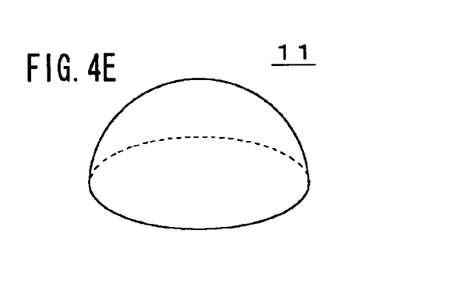
Figure 4F:
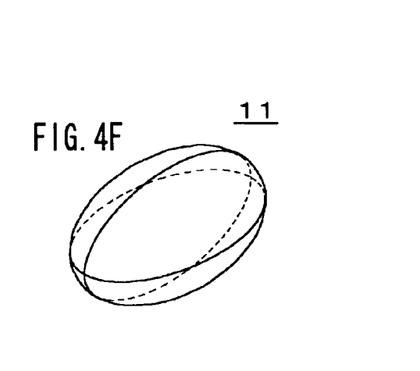

FIG. 4E shows a configuration of the housing 11 having a shape obtained by combining a plane and a curved solid. FIG. 4F shows a configuration of the housing 11 having a shape obtained by combining curved solids. On these configurations, one inner surface having the largest area among the plural inner surfaces of the housing 11 is provided with an electric wave absorber 50.

The following will describe a difference in characteristics between a case where an electric wave absorber is provided in the housing and a case where any electric wave absorber is not provided therein. It is to be noted that if the electronic device has a configuration shown in FIG. 1, an inner surface of the top plate 11a is provided with an electric wave absorber 50.

Figure 5A:
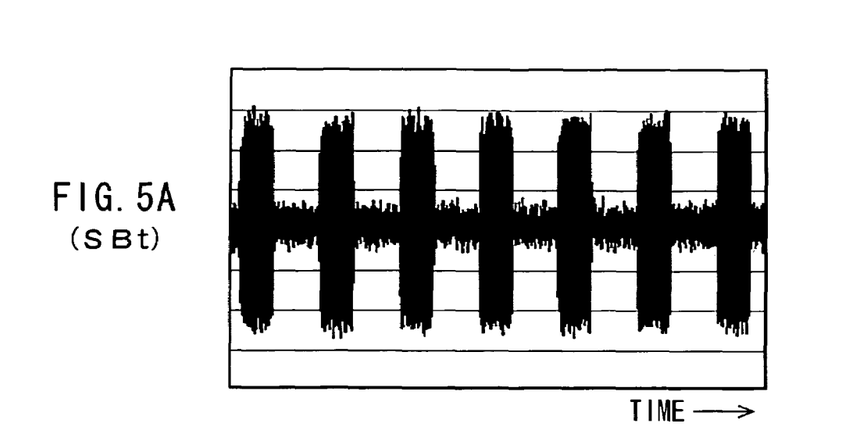
FIGS. 5A through 5C are drawings each for showing characteristics when wireless communication is performed using ASK modulation.
Figure 5B:
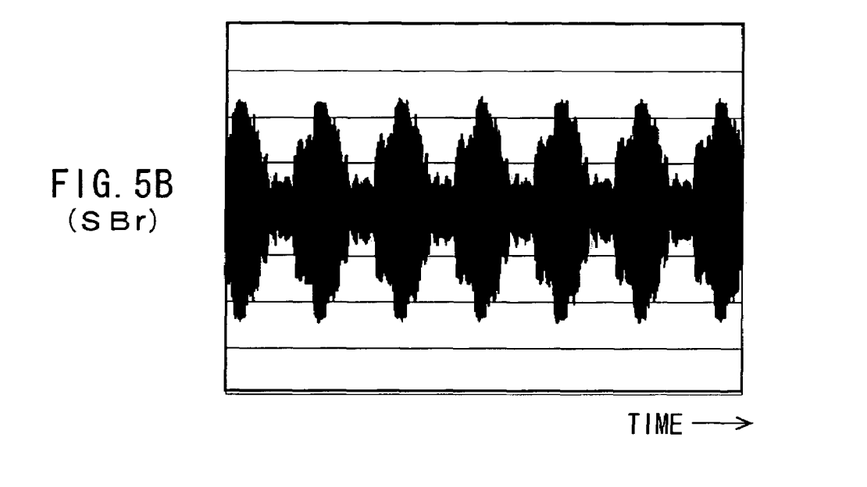
Figure 5C:
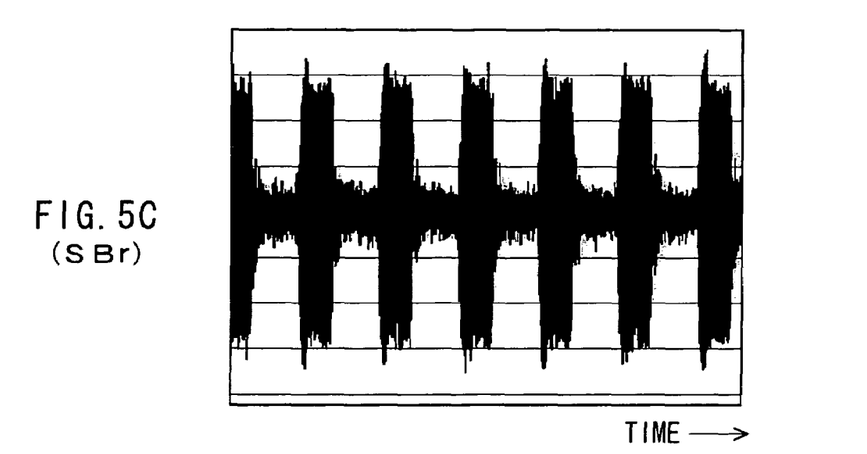

FIGS. 5A through 5C show characteristic in a case where wireless communication is performed between an antenna 31a on the board 21a shown in FIG. 1 and an antenna 31be on the board 21be that is opposite to the board 21a using amplitude shift keying (ASK) modulation. In each of the FIGS. 5A through 5C, a vertical axis indicates a level of signal and a horizontal axis indicates time.

The antenna 31a transmits a signal SBt having a waveform shown in FIG. 5A to the antenna 31b. If an electric wave absorber is not provided in the housing, the antenna 31be receives a signal SBr having a distorted waveform shown in FIG. 5B. If, however, an inner surface of the top plate 11a in the housing 11 is provided with the electric wave absorber 50, the antenna 31be can receive a signal SBr having a less distorted waveform shown in FIG. 5C. Thus, it is possible to reduce any influence of multi-path fading by providing one inner surface having the largest area among the plural inner surfaces of the housing 11 with an electric wave absorber, thereby enabling a good wireless communication to be performed in the housing.

Figure 6:
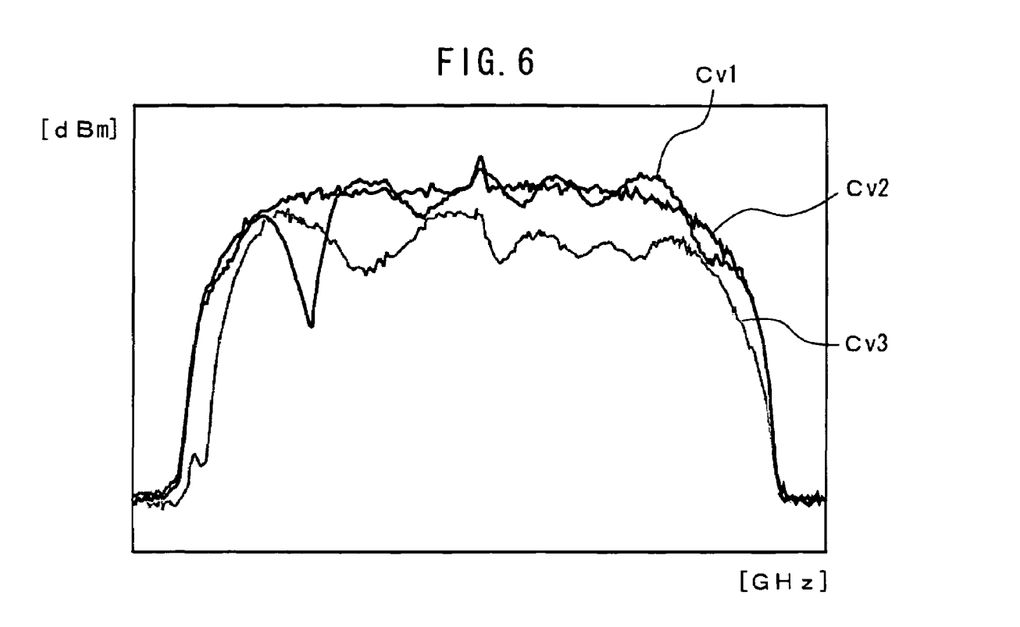
FIG. 6 is a drawing for showing characteristics when wireless communication is performed using QPSK modulation.

The following will describe characteristics when wireless communication is performed using another communication scheme. FIG. 6 shows characteristic in a case where wireless communication is performed between an antenna 31c on the board 21c shown in FIG. 1 and an antenna 31e on the board 21e that is opposite to the board 21c using quadrature phase shift keying (QPSK) modulation. In the FIG. 6, a vertical axis indicates a power level and a horizontal axis indicates frequency.

The antenna 31c on the board 21c transmits a signal SCt and the antenna 31e on the board 21e receives an electric wave from the antenna 31c. If an electric wave absorber is not provided in the housing, the antenna 31c receives a signal SCre, which has, for example, a spectrum curve Cv1 shown in FIG. 6, obtained from the received electric wave. This indicates a larger level shift over the frequencies. If, however, an inner surface of the top plate 11a in the housing 11 is provided with the electric wave absorber 50, the antenna 31c can receive a signal SCre having, for example, a spectrum curve Cv2 shown in FIG. 6. This indicates a smaller level shift over the frequencies. Thus, it is possible to reduce any influence of multi-path fading by providing one inner surface having the largest area among the plural inner surfaces of the housing 11 with an electric wave absorber, thereby enabling a good wireless communication to be performed in the housing.

If a height of the housing 11 alters a little (for example, some millimeters), the antenna 31c receives a signal SCre having, for example, a spectrum curve Cv3 shown in FIG. 6 when an electric wave absorber is not provided in the housing. This indicates a larger level shift over the frequencies. If, however, an inner surface of the top plate 11a in the housing 11 is provided with the electric wave absorber 50, the antenna 31c can receive a signal SCre having, for example, a spectrum curve identical to the spectrum curve Cv2 shown in FIG. 6 even when a height of the housing 11 alters. This allows any influence of multi-path fading to be reduced, thereby enabling a good wireless communication to be performed in the housing.

Figure 7:
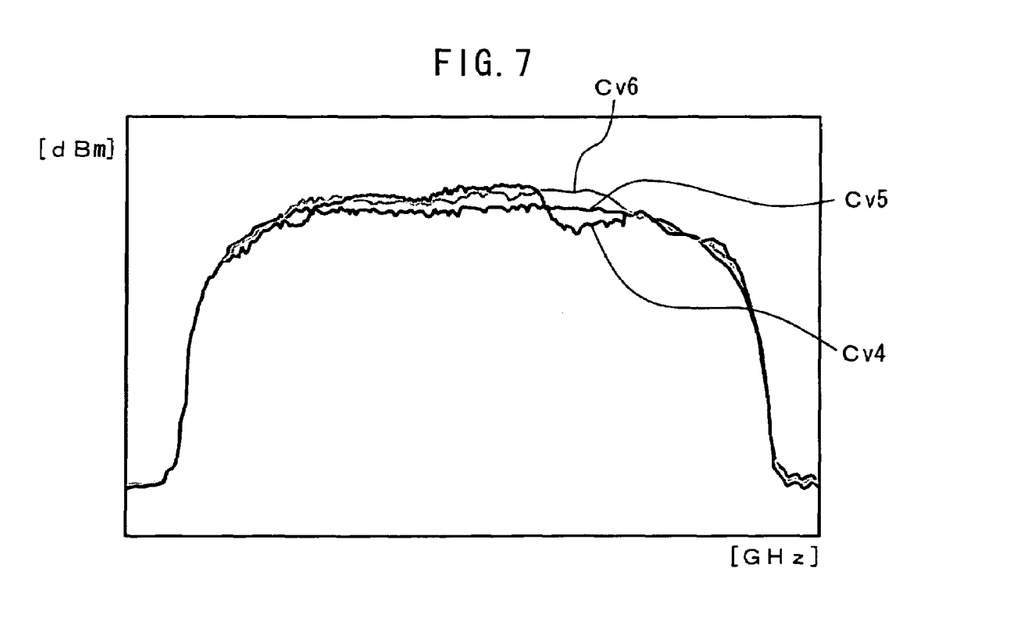
FIG. 7 is a drawing for showing characteristics when a direction of wireless communication as shown in FIG. 6 is changed.

Further, according to an embodiment of the invention, it is possible to reduce any influence of multi-path fading by alteration in a direction of wireless communication. FIG. 7 shows characteristics when a direction of wireless communication as shown in FIG. 6 is changed. Wireless communication is performed between an antenna 31e on the board 21e shown in FIG. 1 and an antenna 31f on the board 21f that is opposite to the board 21e using quadrature phase shift keying (QPSK) modulation. In the FIG. 7, a vertical axis indicates a power level and a horizontal axis indicates frequency.

The antenna 31e on the board 21e transmits a signal SCt and the antenna 31f on the board 21f receives an electric wave from the antenna 31e. If an electric wave absorber is not provided in the housing, the antenna 31f receives a signal SCrf, which has, for example, a spectrum curve Cv4 shown in FIG. 7, obtained from the received electric wave. This indicates a larger level shift over the frequencies. If, however, an inner surface of the top plate 11a in the housing 11 is provided with the electric wave absorber 50, the antenna 31f can receive a signal SCrf having, for example, a spectrum curve Cv5 shown in FIG. 7. This indicates a smaller level shift over the frequencies. Thus, it is possible to reduce any influence of multi-path fading by providing one inner surface having the largest area among the plural inner surfaces of the housing 11 with an electric wave absorber, thereby enabling a good wireless communication to be performed in the housing.

In the contrary communication direction, the antenna 31f on the board 21f transmits a signal SCt and the antenna 31e on the board 21e receives an electric wave from the antenna 31f. In this case, if an electric wave absorber is not provided in the housing, the antenna 31e receives a signal SCre, which has, for example, a spectrum curve Cv6 shown in FIG. 7, obtained from the received electric wave. This indicates a larger level shift over the frequencies. If, however, an inner surface of the top plate 11a in the housing 11 is provided with the electric wave absorber 50, the antenna 31e can receive a signal SCre having a spectrum curve identical to the spectrum curve Cv5 shown in FIG. 7. This indicates a smaller level shift over the frequencies. Thus, it is possible to reduce any influence of multi-path fading by providing one inner surface having the largest area among the plural inner surfaces of the housing 11 with an electric wave absorber, thereby enabling a good wireless communication to be performed in the housing.

Figure 8:
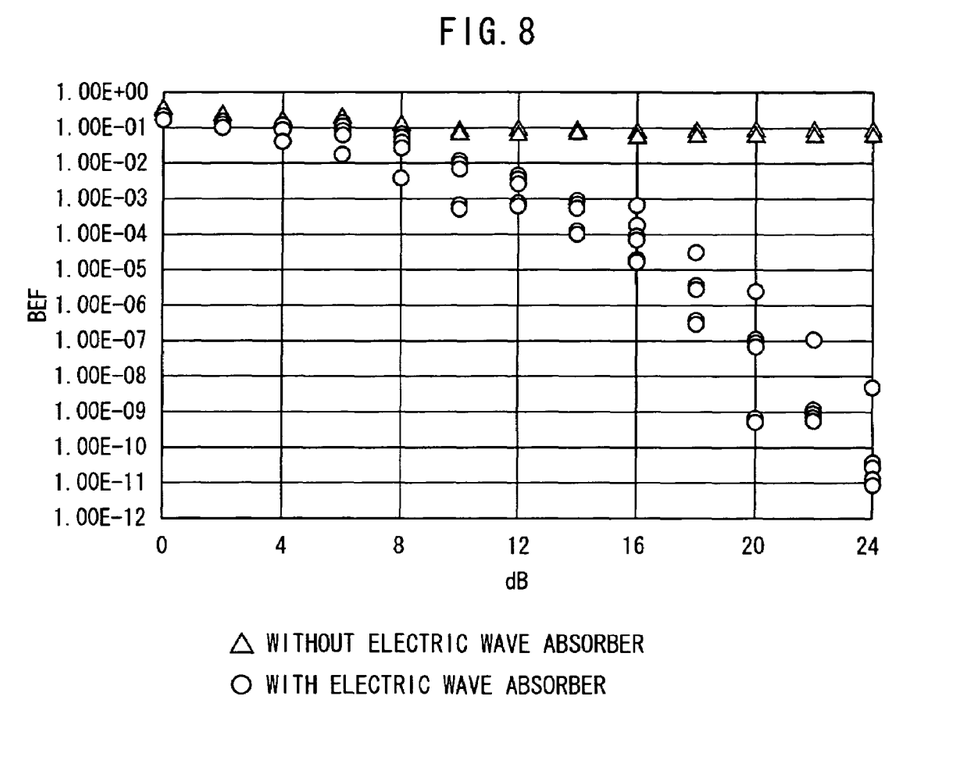
FIG. 8 is a graph for showing transmission bit error characteristics.

FIG. 8 shows transmission bit error characteristics. In FIG. 8, a vertical axis indicates a transmission bit error rate and a horizontal axis indicates S/N ratio. Characteristic when an electric wave absorber is provided is plotted by encircled marks while characteristic when an electric wave absorber is not provided is plotted by triangular marks.

Since noise components are rich when S/N ratio is low, the transmission bit error rate deteriorates because of both of influence of multi-path fading and the noise components. Even if reducing the influence of multi-path fading, the transmission bit error rate deteriorates because of only the noise components. There is a small difference in the transmission bit error rate between a case where an electric wave absorber is provided in the housing and a case where any electric wave absorber is not provided therein. If S/N ratio is higher, however, noise components are not rich. Therefore, deterioration of the transmission bit error rate is mainly based on the influence of multi-path fading when S/N ratio is higher. Thus, if S/N ratio is higher, transmission bit error rate when an electric wave absorber is provided in the housing is falls down vastly as compared with that when any electric wave absorber is not provided. It emerges that by providing the electric wave absorber to reduce the influence of multi-path fading, the transmission bit error rate falls down. Such the transmission bit error characteristics reveal that providing the electric wave absorber allows the influence of multi-path fading to be reduced, thereby enabling a good wireless communication to be performed in the housing.

According to the embodiments of the electronic device of the invention, it is possible to reduce the influence of multi-path fading by providing only one inner surface having the largest area, not the whole of inside of the housing, with an electric wave absorber, so that the electronic device can be configured at low price.

According to the embodiments of the electronic device of the invention, it is possible to reduce the influence of multi-path fading in spite of a communication scheme and a direction of wireless communication, so that an inside of the housing can be easily designed.

According to the embodiments of the electronic device of the invention, it is unnecessary for any wiring and wiring pattern for connecting inner blocks to be provided in the housing. This allows the electronic device to be effectively downsized.

It should be understood by those skilled in the art that various modifications, combinations, sub-combinations and alternations may occur depending on design requirements and other factors insofar as they are within the scope of the appended claims or the equivalents thereof.

What is claimed is:

1. An electronic device comprising:
    a housing having plural inner surfaces forming an open interior, at least one of the plural inner surfaces having a curved solid shape;
    plural boards vertically mounted on at least one of the plural inner surfaces of the housing; and
    a communication section provided on each of the plural boards, said communication section performing wireless communication to each of the other plural boards, wherein
    only one inner surface of the housing has an electric wave absorber that absorbs an electric wave for use of the wireless communication,
    a plural inner surface of the plural inner surfaces having the largest area includes the electric wave absorber,
    the inner surface with the largest area has the curved solid shape, and
    the largest area surface is a top surface or a side surface.

2. The electronic device according to claim 1, wherein at least two inner surfaces have a curved solid shape.

3. A method of reducing multi-path fading in a housing that has plural inner surfaces forming an open interior, at least one of the plural inner surfaces having a curved solid shape, said method comprising:
    providing only one inner surface with the largest area of the plural inner surfaces of the housing with an electric wave absorber; and
    performing wireless communication in the housing, wherein
    the inner surface with the largest area has the curved solid shape, and
    the largest surface is the top surface or the side surface.

4. The method according to claim 3, wherein at least two inner surfaces have a curved solid shape.

* * * * *